Patented Sept. 27, 1938

2,131,176

UNITED STATES PATENT OFFICE 2,131,176

VAT DYESTUFFS OF THE BENZANTHRONYLAMINOANTHRAQUINONE SERIES

Ernst Honold, Frankfort-on-the-Main-Fechenheim, Germany, assignor to General Aniline Works, Inc., New York, N. Y., a corporation of Delaware No Drawing. Original application July 15, 1936, Serial No. 90,730. Divided and this application November 13, 1937, Serial No. 174,353. In Germany July 17, 1935

4 Claims. (Cl. 260—274)

This application is a division of my application Serial No. 90,730, filed July 15, 1936, which relates to vat dyestuffs of the benzanthronylaminoanthraquinone series.

My present invention relates to new vat dyestuffs of the benzanthronylaminoanthraquinone series, more particularly those of the general formula:

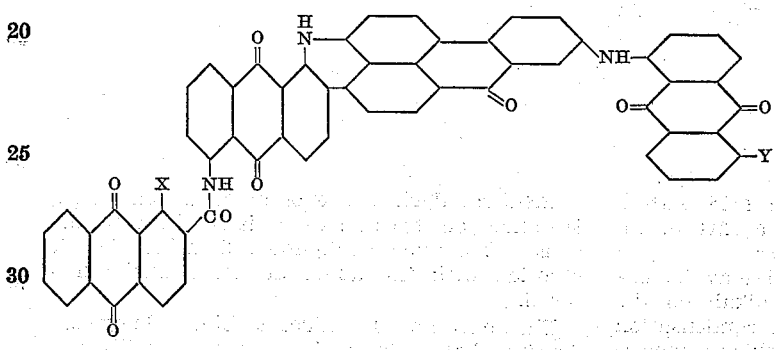

wherein X stands for a member selected from the group consisting of $NH_2$ and $NO_2$ and wherein Y stands for a member selected from the group consisting of hydrogen and an anthraquinone-2-carboxylic acid amide radicle substituted in the 1-position by the radicle X which has the above said signification.

The new dyestuffs are obtained by acting with anthraquinone-2-carboxylic acid chlorides of the general formula:

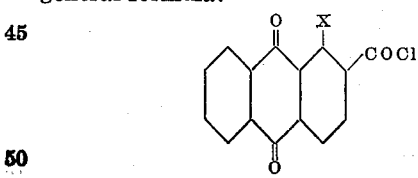

wherein X stands for a member selected from the group consisting of $NH_2$ and $NO_2$, on alkaline condensation products of bz1-benzanthronyl-1-aminoanthraquinones of the general formula:

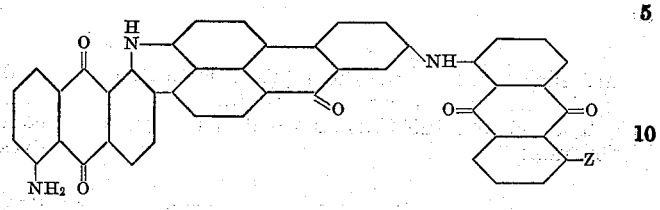

wherein Z stands for a member selected from the group consisting of H and $NH_2$.

The new dyestuffs thus obtained dye the vegetable fibre brownish violet shades of very good fastness properties. They are especially valuable products on account of the red color component contained in the shades obtained therewith, since it is impossible to obtain violet shades with the same good fastness properties by means of analogous dyestuffs which do not contain a radicle of the anthraquinone-2-carboxylic acid of the above said general formula.

In order to further illustrate my invention the following examples are given, the parts being by weight and all temperatures in degrees centigrade.

Example 1

66 parts of the condensation product of the formula:

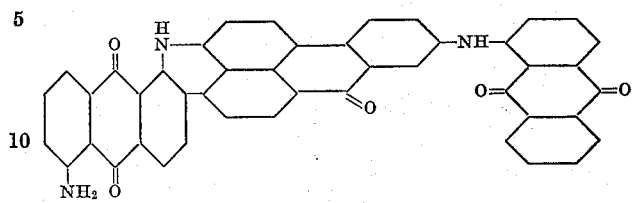

are suspended in about 600 parts of ortho-dichlorobenzene. Then, at about 160°, 35 parts of 1-nitroanthraquinone-2-carboxylic acid are slowly added and the mixture is heated to boiling for some hours while stirring.

The new dyestuff thus obtained of the general formula:

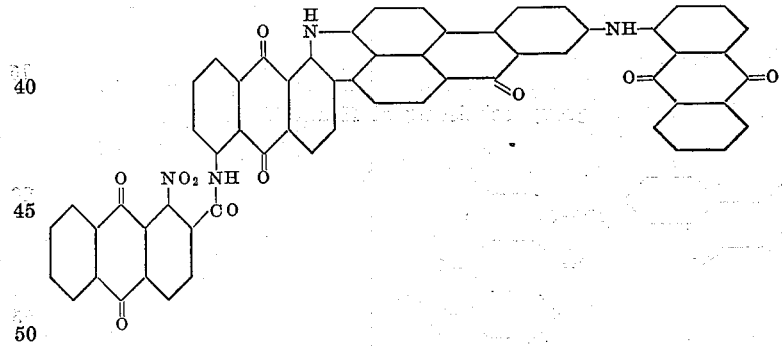

dissolves in concentrated sulfuric acid with a green color and dyes cotton from a dark brown vat very fast brownish violet shades.

The aforesaid starting material may be obtained by the action of caustic alkali on the product obtainable by consecutive condensation of bz1-6-dibromobenzanthrone with one molecular proportion of 1-amino-5-benzoylaminoanthraquinone and of 1-aminoanthraquinone, the benzoyl group being split off by saponification. This initial material dyes cotton from a brownish black vat grey shades which are not fast to chlorine.

Example 2

53 parts of the condensation product of the formula

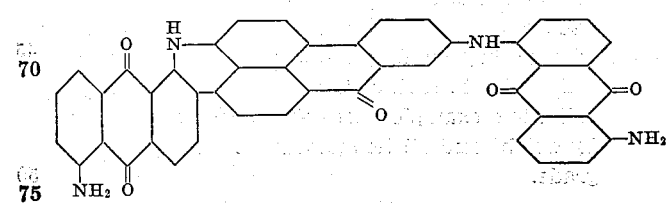

are suspended in a finely divided form in about 600 parts of ortho-dichlorobenzene. Then 35 parts of 1-nitro-anthraquinone-2-carboxylic acid chloride are slowly added and the mixture is heated to boiling for some hours in an apparatus provided with a stirrer and a reflux condenser. The dyestuff thus obtained of the formula:

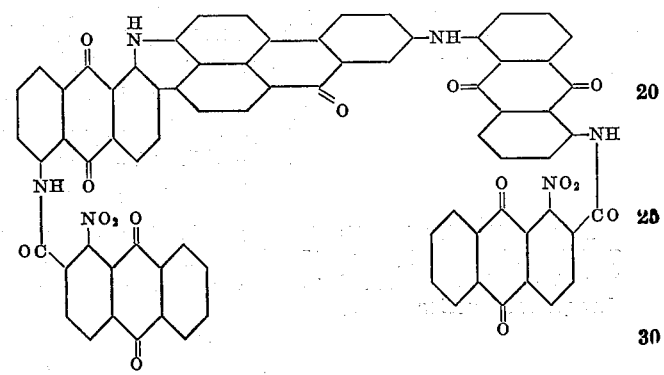

is distinguished by a good solubility in the vat and by a good levelling power. It dissolves in concentrated sulfuric acid with a green color and dyes cotton from a blackish vat fast violet shades.

Identical dyeings are obtained by employing the analogous dyestuff which is obtained by condensing 1-aminoanthraquinone-2-carboxylic acid chloride with the above described initial material.

The above initial product is obtainable by condensing bz1-6-dibromobenzanthrone with two molecular proportions of either 1.5-diaminoanthraquinone or of 1-amino-5-benzoylaminoanthraquinone, and subjecting the condensation products to the action of alcoholic caustic potash, in the latter case the benzoyl group being split off. The initial product thus formed dissolves in concentrated sulfuric acid with a green color and dyes cotton from a brownish black vat gray shades which are not fast to chlorine.

I claim:

1. Vat dyestuffs of the benzanthronylaminoanthraquinone series of the general formula:

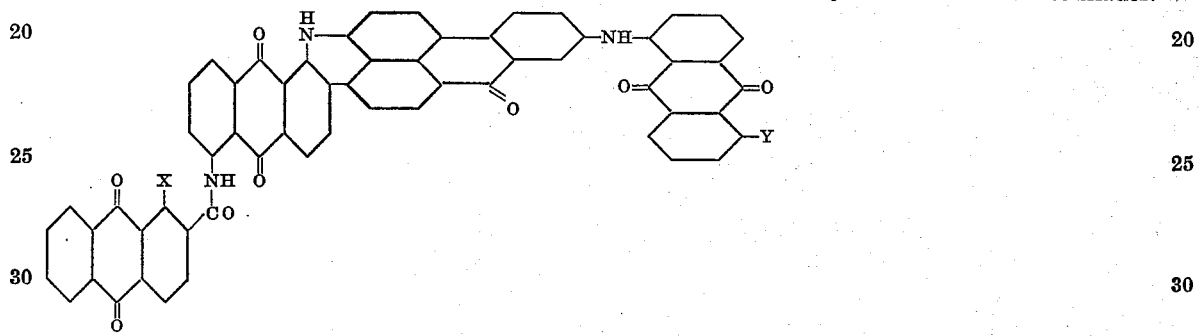

wherein X stands for a member selected from the group consisting of $NH_2$ and $NO_2$ and wherein Y stands for a member selected from the group consisting of hydrogen and an anthraquinone-2-carboxylic acid amide radicle substituted in the 1-position by the radicle X which has the above said signification, which dyestuffs dye the vegetable fiber brownish violet shades of very good fastness properties.

2. The vat dyestuff of the formula:

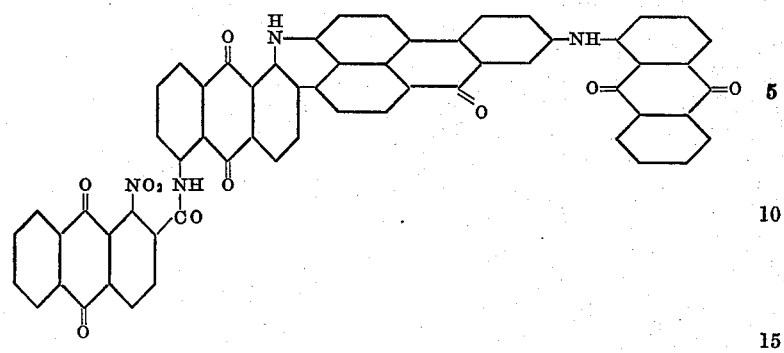

which dyestuff dissolves in concentrated sulfuric acid with a green color and dyes cotton from a dark brown vat very fast brownish violet shades.

3. The vat dyestuff of the formula:

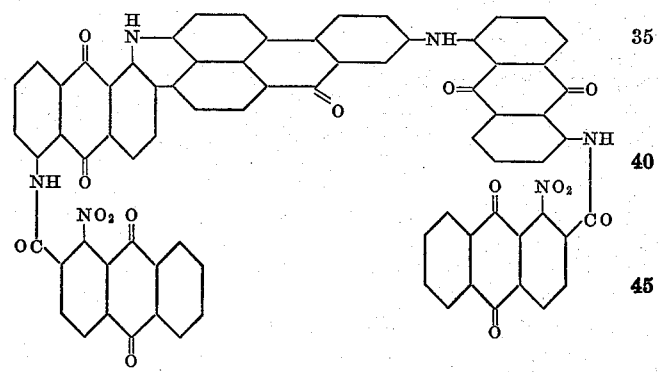

which dyestuff dissolves in concentrated sulfuric acid with a green color and dyes cotton from a black vat very fast violet shades.

4. The vat dyestuff of the formula:

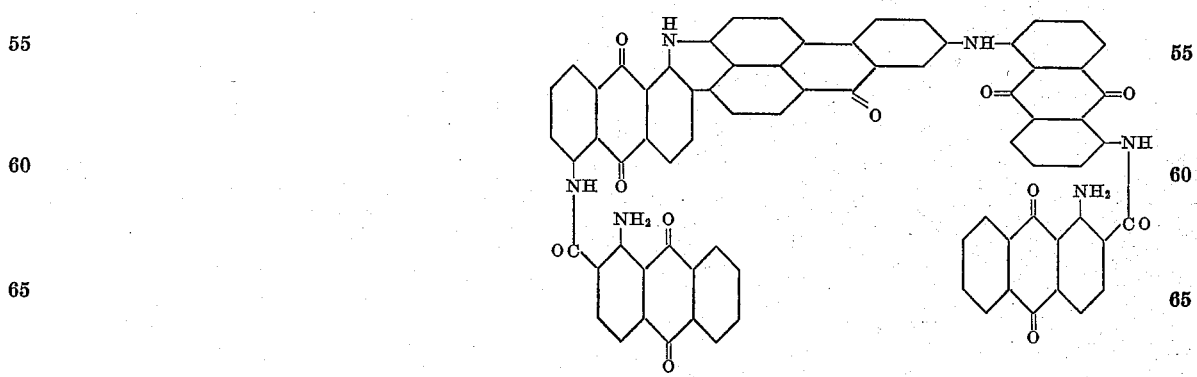

which dyestuff dissolves in concentrated sulfuric acid with a green color and dyes cotton from a black vat very fast violet shades.

ERNST HONOLD.